(12) United States Patent
Müller et al.

(10) Patent No.: US 8,233,927 B2
(45) Date of Patent: Jul. 31, 2012

(54) SYNCHRONIZATION OF MEDIA GATEWAYS IN AN IP TELECOMMUNICATION SYSTEM

(75) Inventors: Rainer Müller, Lengdorf (DE); Andreas Krantzik, Bickenbach (DE)

(73) Assignee: Avaya Inc., Basking Ridge, NJ (US)

( * ) Notice: Subject to any disclaimer, the term of this patent is extended or adjusted under 35 U.S.C. 154(b) by 1618 days.

(21) Appl. No.: 11/361,495

(22) Filed: Feb. 23, 2006

(65) Prior Publication Data

US 2006/0211401 A1      Sep. 21, 2006

(30) Foreign Application Priority Data

Feb. 26, 2005   (DE) .......................... 10 2005 008 906

(51) Int. Cl.
*H04B 15/00*    (2006.01)
*H04J 3/06*     (2006.01)

(52) U.S. Cl. ........ 455/502; 455/507; 455/403; 455/561; 455/349; 370/350; 370/310; 370/324; 370/328; 370/498; 370/503; 370/507; 370/252; 375/272; 375/356

(58) Field of Classification Search .................. 370/338, 370/468, 469, 401, 350, 310, 324, 328, 498, 370/503, 507, 252, 395.52; 455/502, 507, 455/403, 561, 349; 375/272, 356
See application file for complete search history.

(56) References Cited

U.S. PATENT DOCUMENTS 6,542,754 B1     4/2003   Sayers et al.
(Continued)

FOREIGN PATENT DOCUMENTS

CA          2495049 A1      2/2004
(Continued)

OTHER PUBLICATIONS

Aziz Miah and Kenneth Tan, "An Overview of 3G Mobile Network Infrastructure", 2002 Student Conference on Research and Development Proceedings, 2002, p. 228-232, IEEE, Shah Alam, Malaysia.

*Primary Examiner* — Ajit Patel
*Assistant Examiner* — Khai M Nguyen
(74) *Attorney, Agent, or Firm* — Sheridan Ross P.C.

(57) ABSTRACT

Telecommunication system based on IP technology, comprising a primary media gateway (1), at least one secondary media gateway (2, 3) to be synchronized onto the primary media gateway (1), and several radio base stations (4-10), at each secondary media gateway (2, 3), at least one radio base station (5, 9) connected to it being provided with a device with which the radio base station (5, 9) can be synchronized onto the emission of another radio base station (4, 8) in order to regenerate the system clock and to transmit it to the connected secondary media gateway (2, 3), and each secondary media gateway (2, 3) being provided with at least one connection for a radio base station (5, 9), through which the regenerated clock can be received and used for controlling the internal clock of the secondary media gateway (2, 3).

8 Claims, 1 Drawing Sheet

U.S. PATENT DOCUMENTS

| | | | |
|---|---|---|---|
| 6,819,682 B1 * | 11/2004 | Rabenko et al. | 370/503 |
| 2001/0030954 A1 | 10/2001 | Hameleers et al. | |
| 2002/0012362 A1 * | 1/2002 | Yahata et al. | 370/503 |
| 2003/0058814 A1 * | 3/2003 | Kim | 370/328 |
| 2004/0081117 A1 * | 4/2004 | Malek et al. | 370/324 |
| 2006/0025181 A1 | 2/2006 | Kalofonos et al. | |
| 2010/0099451 A1 * | 4/2010 | Saban et al. | 455/502 |
| 2010/0167758 A1 * | 7/2010 | Mukai et al. | 455/456.2 |

FOREIGN PATENT DOCUMENTS

| | | |
|---|---|---|
| EP | 1122959 | 8/2001 |
| EP | 1209844 | 5/2002 |
| WO | WO 00/69102 A1 | 11/2000 |
| WO | WO 0069102 A1 * | 11/2000 |
| WO | WO 2005/006598 A1 | 1/2005 |

* cited by examiner

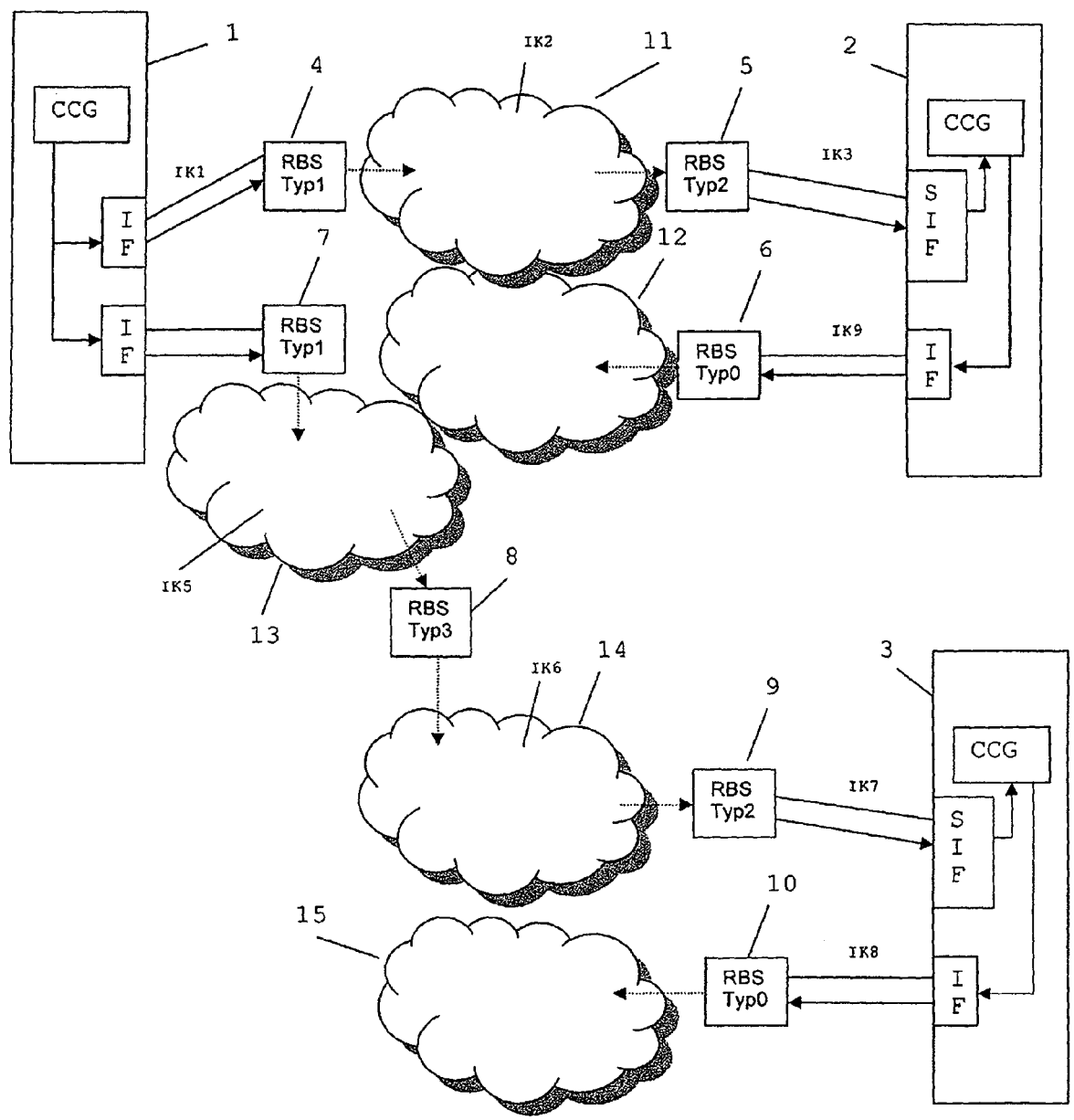

SYNCHRONIZATION OF MEDIA GATEWAYS IN AN IP TELECOMMUNICATION SYSTEM

FIELD OF THE INVENTION

The present invention relates to a telecommunication system based on IP technology, comprising a primary media gateway, at least one secondary media gateway to be synchronized onto the primary media gateway, and several radio base stations, as well as a synchronization method according to the features of the generic parts of the independent patent claims.

BACKGROUND OF THE INVENTION

It is known that line-switching telecommunication systems can be replaced through packet-switching telecommunication systems, functioning, for example, on the basis of IP (IP: Internet Protocol). Such telecommunication systems use the infrastructure of, for example, an existing computer network, making a parallel, second infrastructure for telephony superfluous. IP telephones can directly be connected to such a telecommunication system, whereas the use of conventional telephones requires the utilization of a so-called media gateway, which translates line-switched data into packet-switched data and vice versa. In doing so, each media gateway generates an internal clock, which will be needed if, for example, terminals shall be connected to the media gateway via an ISDN interface.

Radio base stations can also be connected to the media gateways in order to operate wireless terminals. To enable a roaming or handover between radio base stations, the radio base stations must be operated in a clock-synchronous way. If the so-called jitter becomes to large, i.e. if the difference with which several radio base stations start emitting the same data frame, fluctuates beyond a certain value, the terminal synchronized onto one radio base station will not recognize the other radio base station and a roaming or handover will not be possible. Therefore, the media gateways to which the radio base stations are connected have to be synchronized, which is, however, not possible with the necessary precision through a packet-switching network.

SUMMARY

It is, therefore, the object of the present invention to provide a telecommunication system based on IP technology with synchronized media gateways, and a method for synchronizing media gateways in telecommunication systems based on IP technology.

This problem is solved by a telecommunication system with the features of claim 1 and a synchronization method with the features of claim 6.

A telecommunication system according to the present invention comprises first of all an IP network in which the basic data transmission takes place. Several media gateways are connected to the IP network which serve as adaptors to connect line-switching terminals, such as telephones, fax machines, radio base stations or other equipment to the IP network. One media gateway is referred to as the primary media gateway because its clock is used as a reference clock for other media gateways. Media gateways to be synchronized onto the primary media gateway are referred to as secondary media gateways. These are at least the media gateways connected to the radio base stations for which a roaming or handover shall be possible. Furthermore, the telecommunication system can possess media gateways which do not require any synchronization and which are able to generate their own clock independently, for example if only wireline terminals or autonomous radio base stations shall be connected to it.

Synchronization is effected as follows: a primary media gateway generates a system clock and transmits it together with runtime information to at least one radio base station, which emits a signal which is received by at least one other radio base station. The runtime information includes both the relevant cable running times between the components of the telecommunication system and the internal processing times of the individual relevant components. The at least one other radio base station regenerates the system clock from the received signal and transmits the system clock together with the runtime information to a secondary media gateway connected to the radio base station.

For this purpose, at least one of the radio base stations connected to each secondary media gateway is provided with an equipment with which the radio base station can be synchronized onto the emission of another radio base station, in order to regenerate the system clock and to transmit it to the connected secondary media gateway. Each secondary media gateway is provided with at least one connection for a radio base station, through which the regenerated clock can be received and used for controlling the internal clock of the secondary media gateway. This results in a synchronization controlled system between the primary media gateway and at least one secondary media gateway.

Depending on their tasks in the synchronization controlled system, the radio base stations are of different types. A radio base station emitting the system clock as well as runtime information will in the following be referred to as radio base station type 1. Radio base stations which are connected to a secondary media gateway, regenerate the clock and the runtime information and transmit them to the secondary media gateway, are referred to as type 2. Type 0 designates radio base stations which are not used for synchronizing secondary media gateways. Such radio base stations are known and are already widely being used.

The clock received by a secondary media gateway through the interface with a radio base station type 2 is used for controlling the internal clock generator. With that and with the additionally received runtime information, the synchronism between the radio base stations of the media gateways can be established. This is effected, among others, by means of the existing capability of the radio base stations to compensate runtime differences.

In a further embodiment, the telecommunication system has at least one radio base station with relay function, which is not wireline-connected to a media gateway and which, as an inserted radio base station, repeats the received radio signal. This will be necessary if there is no direct radio connection between a radio base station type 1 and a radio base station type 2. Such a radio base station is referred to as type 3. To bridge larger distances, it is possible to insert several radio base stations of that type as a chain into the overall synchronization controlled system.

That means that the clock is retrieved by synchronizing the media gateway onto the air interface. Furthermore, a runtime compensation is effected by the fact that additional runtime information can be transmitted via the radio base station. It is provided that each intermediate station in the synchronization controlled system increases the runtime information by its own processing time and any cable runtimes. The radio base stations add their own processing times and the media gateways add their processing times as well as the respective cable runtimes to the radio base stations.

The present invention is explained in more detail by means of an embodiment.

BRIEF DESCRIPTION OF THE DRAWINGS

FIG. 1 shows a telecommunication system based on IP technology with media gateways to be synchronized.

DETAILED DESCRIPTION

FIG. 1 shows a telecommunication system based on IP technology with a primary media gateway 1, two secondary media gateways 2, 3 to be synchronized onto the primary media gateway 1, and several radio base stations 4-10. The IP network on which the telecommunication system is based is not shown in FIG. 1.

The clock generator (CCG: Central Clock Generator) of the primary media gateway 1 generates a clock which is transmitted via interfaces (IF: Interface) to the radio base stations (RBS: Radio Base Station) 4 and 7. This is effected through the ISDN connections with which the radio base stations are connected to the media gateways. In addition, in the information channel IK 1, the sum of the internal processing time of the media gateway 1 and the cable runtime are transmitted to the radio base station 4, in the present example through the D-channels of the ISDN connections. In the radio base station 4, the latter's Internal processing time is added to the received runtime information and this information is emitted via the air interface 11. On the air interface 11, the runtime information is transmitted in the information channel 1K 2, which is a dedicated traffic channel.

The radio base station 5 of type 2 synchronizes itself like a mobile terminal onto the air interface 11 and receives the runtime information from 1K 2. It adds its internal processing time and transmits the information through the information channel 1K 3, which is the D-channel of the ISDN connection to the media gateway 2. The secondary media gateway 2 is provided with a connection for the radio base station 5, through which the regenerated clock can be received and which can be used for controlling the internal clock. This connection is a synchronization interface (SIF: Synchronization Interface). The media gateway 2 is able to measure the cable runtime to the radio base station 5 as well as to synchronize its built-in clock generator onto the signal at a synchronization interface and thus onto the clock of the media gateway 1. This is effected by controlling the clock generator of the secondary media gateway through the regenerated clock. In this way, the synchronism of the terminals connected to the other interfaces of the media gateway 2 is guaranteed. In the present example, this is the radio base station 6 of type 0, which emits its signal into a radio range 12. It compensates the signal runtime by means of the runtime information which it received through the information channel 1K 9 from the secondary media gateway 2. For this purpose, the media gateway 2 increased the runtime information received through the 1K 3 by its own processing time as well as by the measured runtimes to the radio base stations 5 and 6.

The media gateway 3 shall also be synchronized onto the clock of the media gateway 1. As there is, however, no direct radio connection between a radio base station 7 connected to the media gateway 1 and a radio base station 9 connected to the media gateway 3, it is necessary to use a relay station, which, in the present example, is constituted by the radio base station 8 of type 3.

The radio base station 7 of type 1 receives from the media gateway 1 the system clock and through 1K 4 the runtime information, which it adds to its own internal processing time. This sum is transmitted through a traffic channel 1K 5 of the air interface 13 and is received by the radio base station 8. This radio base station is also able, just like the base stations type 2, to synchronize itself onto the air interface. However, it does not pulse the received clock signal into a line, but uses it for clock-synchronous transmission via the air interface 14. In doing so, the runtime information is increased by the internal processing time of the radio base station 8 and transmitted through 1K 6. The radio base station 9 synchronizes itself onto the air interface 14, interprets the runtime information, adds its own internal processing time and transmits this sum, analogously to the radio base station 5,—as described above—through IK 7 to the media gateway 3. The media gateway 3 synchronizes its internal clock generator onto the signal of the base station 9 received through the synchronization interface, generating in this way a synchronous clock for its remaining interfaces. To one of these interfaces, the radio base station 10 of type 0 is connected, which emits its signal into the range 15. Preferably, the radio base stations are DECT base stations. Runtime compensation is effected analogously to the process of media gateway 2 and radio base station 6.

Thanks to the capability of the base stations types 2 and 3 to regenerate the system clock from the radio signal on the air interface, the clock of all media gateways can be synchronized. Furthermore, each radio base station receives the runtime information which indicates the runtime which the clock required in each case from the media gateway 1 through the intermediate stations involved. Based on this information, the radio base stations are able to compensate the runtime differences and to guarantee in this way the synchronism on the air interface, which is needed for roaming or handover. In this way, for DECT, the 8 kHz reference clock as well as the 160 ms superframe clock are transmitted. Through the information channels, the superframe number is additionally transmitted in order to guarantee that the radio base stations also function superframe-synchronously.

In principle, each of the radio base stations can emit the desired useful signal (e.g. language) it is, however, also possible that a radio base station type 1, 2 or 3 only emits or receives runtime information and superframe number and thus exclusively serves for synchronization purposes.

The above-described embodiment is merely an example and, therefore, not limiting. In particular, the number of media gateway, the number and type of the radio base stations as well as the times and frequencies given by way of example may vary without departing from the inventive idea.

What is claimed is:

1. A telecommunication system based on IP technology, comprising:
   a primary media gateway;
   at least one secondary media gateway to be synchronized onto the primary media gateway, wherein the primary media gateway is connected to the at least one secondary media gateway through wireless communication; and
   several radio base stations, wherein at each secondary media gateway at least one radio base station is connected to each secondary media gateway through wire-bound communication, wherein the several radio base stations are provided with a device with which at least one of said several radio base stations can be synchronized via radio communication onto the emission of another radio base station connected to said primary media gateway by wire-bound communication in order to regenerate a system clock and to transmit the system clock to the connected secondary media gateway, and wherein each secondary media gateway is provided with at least one connection for a radio base station, through which the regenerated system clock can be received and used for controlling an internal clock of each secondary media gateway.

2. Telecommunication system of claim 1, wherein at least one radio base station is configured with a relay function which is not wireline-connected to a media gateway.

3. Telecommunication system of claim 2, wherein information can additionally be transmitted via the several radio base stations.

4. Telecommunication system of claim 3, wherein the several radio base stations comprise DECT base stations.

5. A synchronization method for media gateways in a telecommunication system based on IP technology, the media gateways connected to each other through wireless communication, comprising:

a primary media gateway of the media gateways generating a system clock and transmitting it together with runtime information to at least one radio base station;

the at least one radio base station emitting a radio signal which is received by at least one other radio base station; and said at least one other radio base station regenerating the system clock from the received radio signal and transmitting the regenerated system clock together with the runtime information to a secondary media gateway of the media gateways connected to said at least one other radio base station, through which the regenerated system clock can be received and used for controlling an internal clock of each secondary media gateway.

6. The synchronization method of claim 5, wherein a clock generator of the secondary media gateway is controlled by the regenerated system clock.

7. The synchronization method of claim 6, wherein the radio signal is repeated by at least one inserted radio base station.

8. The synchronization method of claim 7, wherein each intermediate station in the synchronization controlled telecommunication system increases the runtime information by its own processing time and any cable runtimes.

* * * * *